United States Patent [19]

Howard

[11] Patent Number: 5,697,467
[45] Date of Patent: Dec. 16, 1997

[54] VEHICLE BONNETS

[75] Inventor: Mark Shane Howard, Whitley, United Kingdom

[73] Assignee: Jaguar Cars Limited, Allesley, United Kingdom

[21] Appl. No.: 611,470

[22] Filed: Mar. 6, 1996

Related U.S. Application Data

[63] Continuation of Ser. No. 252,077, Jun. 1, 1994, abandoned.

[30] Foreign Application Priority Data

Jun. 19, 1993 [GB] United Kingdom ............... 9312721

[51] Int. Cl.$^6$ ............................................. B62D 25/12
[52] U.S. Cl. ........................ 180/69.21; 180/274; 16/371; 16/222
[58] Field of Search ................. 180/69.2, 69.21, 180/274; 16/222, 229, 252, 262, 263, 282, 287, 288, 297, 302, 371

[56] References Cited

U.S. PATENT DOCUMENTS

| | | | |
|---|---|---|---|
| 2,197,648 | 4/1940 | Mersheimer . | |
| 2,254,088 | 8/1941 | Peterson | 180/69.21 |
| 2,668,320 | 2/1954 | Lustig . | |
| 2,840,847 | 7/1958 | Danser | 16/288 |
| 2,956,303 | 10/1960 | Fiedler | 16/288 |
| 3,009,192 | 11/1961 | Fiedler et al. | 16/288 |
| 3,351,975 | 11/1967 | Goto | 16/288 |
| 3,400,974 | 9/1968 | Gage | 16/367 |
| 3,643,755 | 2/1972 | Gionet et al. . | |
| 3,815,176 | 6/1974 | Porter . | |
| 4,093,290 | 6/1978 | Pearson . | |
| 4,125,170 | 11/1978 | Botz . | |
| 4,249,632 | 2/1981 | Lucchini et al. . | |
| 4,382,312 | 5/1983 | Liggett et al. . | |
| 4,747,637 | 5/1988 | Lenoir et al. . | |
| 5,263,546 | 11/1993 | Cady et al. . | |
| 5,435,406 | 7/1995 | Gaffoglio et al. | 180/69.21 |

FOREIGN PATENT DOCUMENTS

| | | | |
|---|---|---|---|
| 152609 | 5/1952 | Canada | 16/287 |
| 0 509 690 | 10/1992 | European Pat. Off. . | |
| 2664555 | 1/1992 | France | 180/69.21 |
| 2 313 949 | 10/1974 | Germany . | |
| 2 711 339 | 9/1978 | Germany . | |
| 58-221773 | 12/1983 | Japan . | |
| 59-6174 | 1/1984 | Japan . | |
| 622046 | 4/1949 | United Kingdom . | |
| 684826 | 12/1952 | United Kingdom | 16/302 |
| 1 476 250 | 6/1977 | United Kingdom . | |

OTHER PUBLICATIONS

Abstract of Japanese vol. 8, No. 61 (M-284) (1498) 23 Mar. 1984 Abstract JP-A-58 211 975 (Nissan) Dec. 12, 1983.

Primary Examiner—Brian L. Johnson
Assistant Examiner—Min Yu
Attorney, Agent, or Firm—Davis and Bujold

[57] ABSTRACT

A vehicle bonnet assembly has a bonnet hinged to the vehicle body by means of a hinge assembly including a first link pivoted intermediate of its extremities to the vehicle body and second and third links pivoted at one end, each to a different end of the first link, and at their other ends to the bonnet, the links being arranged such that when the bonnet is closed, the bonnet will move rearwardly upon an impact above a predetermined magnitude being applied to the leading edge of the bonnet, the links pivoting to lift the trailing edge of the bonnet, the bonnet pivoting between an open and closed position about the pivotal connection of the first link to the vehicle body.

9 Claims, 4 Drawing Sheets

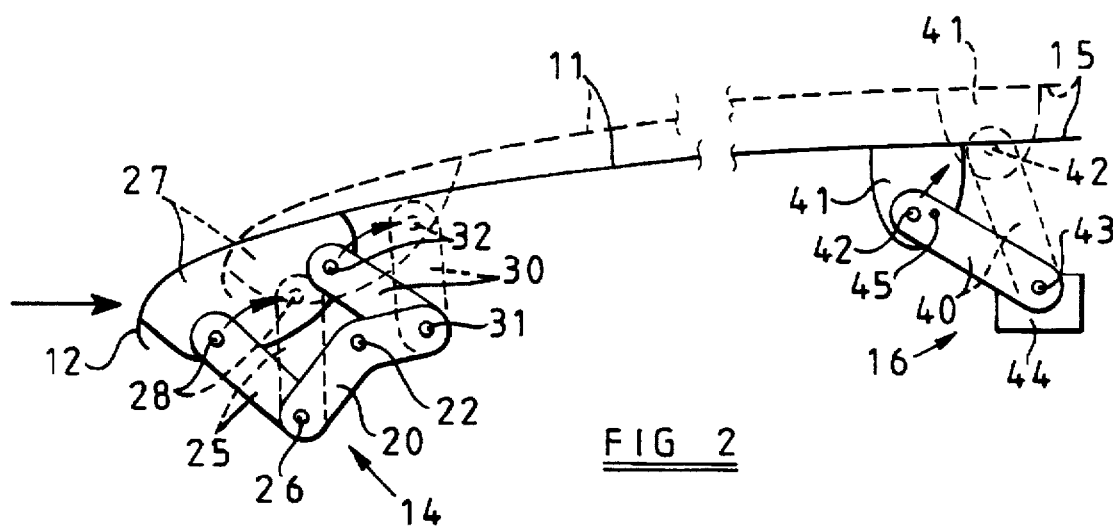
FIG 2
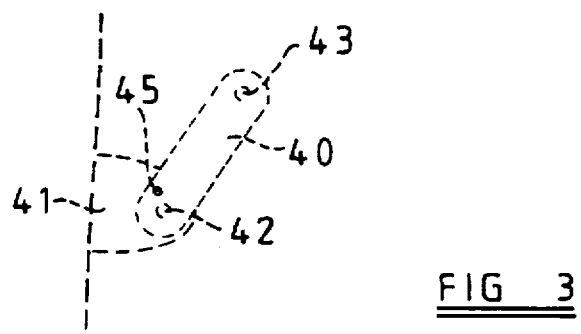
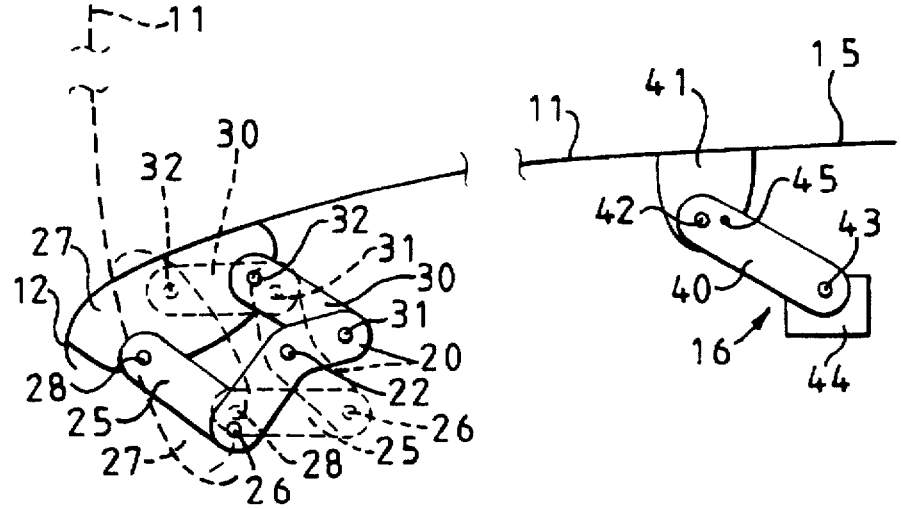
FIG 3

VEHICLE BONNETS

This application is a continuation of application Ser. No. 08/252,077 filed on Jun. 1, 1994 and now abandoned.

BACKGROUND TO THE INVENTION

The present invention relates to vehicle bonnets and in particular to bonnets for motor cars.

In modern motor car design, for visibility, aerodynamic and styling reasons, it is desirable that the bonnet line is kept as low as possible. As a result, there is generally very little clearance between the bonnet and the engine bay contents of the motor vehicle. Consequently the bonnet will provide very little cushioning effect when impacted by a pedestrian during an accident.

EP-A-0,509,690 discloses a vehicle bonnet which is hinged at its leading edge. The hinge mechanism by which the bonnet is attached to the vehicle, is arranged to cause the trailing edge of the bonnet to lift when the forward edge of the bonnet is impacted by a pedestrian during an accident. With the hinge mechanism disclosed in the above patent specification, the leading edge of the bonnet moves downwardly, requiring a clearance beneath the bonnet forward of the hinge assembly. This requirement will impose restrictions on the height of the bonnet at its leading edge and/or the positioning of components, for example the radiator beneath the bonnet adjacent its leading edge.

The present invention provides a hinge mechanism for a forwardly hinged bonnet, which will enable the trailing edge of the bonnet to be raised whilst minimising the lowering of the leading edge.

SUMMARY OF THE INVENTION

In accordance with the present invention a vehicle bonnet assembly includes a bonnet, said bonnet being hinged to the vehicle body adjacent a first edge transverse to the longitudinal axis of the vehicle and having releasable latch means adjacent a second edge transverse to the longitudinal axis of the vehicle, the bonnet being hinged to the vehicle body by means of a hinge assembly comprising a first link pivoted intermediate of its extremities to either the vehicle body or bonnet and second and third links pivoted at one end, each to a different end of the first link, and at their other ends to the other of said bonnet or vehicle body, the links being arranged such that when the bonnet is closed, upon rearward movement of the bonnet in response to an impact above a predetermined magnitude being applied to the leading edge of the bonnet, the links will pivot to lift the bonnet, the bonnet being pivoted between an open and closed positions about the pivotal connection of the first link to the vehicle body or bonnet.

Preferably, the links are arranged such that an impact to the leading edge of the bonnet will cause the bonnet to lift along its full length. Lifting of the bonnet in this manner may be controlled by pivoting of the second and third links or pivoting of all three links. When the bonnet is moved between its open and its closed positions, in addition to pivoting of the first link about its pivotal connection to the vehicle body or bonnet, the second and third links may also pivot, in order to increase the degree to which the bonnet will open.

The hinge assembly may be tuned to provide the required movement of the bonnet in the various modes of movement of the bonnet, by appropriate selection of the lengths of the links and the torsional stiffness of the pivots. Alternatively or in addition, one or more of the links may be resiliently biased by spring means.

Preferably, in addition to the hinge mechanism, means is provided for controlling movement of the trailing edge of the bonnet.

BRIEF DESCRIPTION OF THE DRAWINGS

The invention is now described, by way of example only, with reference to the accompanying drawings, in which:

FIG. 2 is a longitudinal cross-sectional view of the bonnet assembly illustrated in FIG. 1, with the bonnet in its closed position;

FIG. 3 is a view similar to FIG. 2 with the bonnet in its open position;

DESCRIPTION OF A PREFERRED EMBODIMENT

Figure 1:
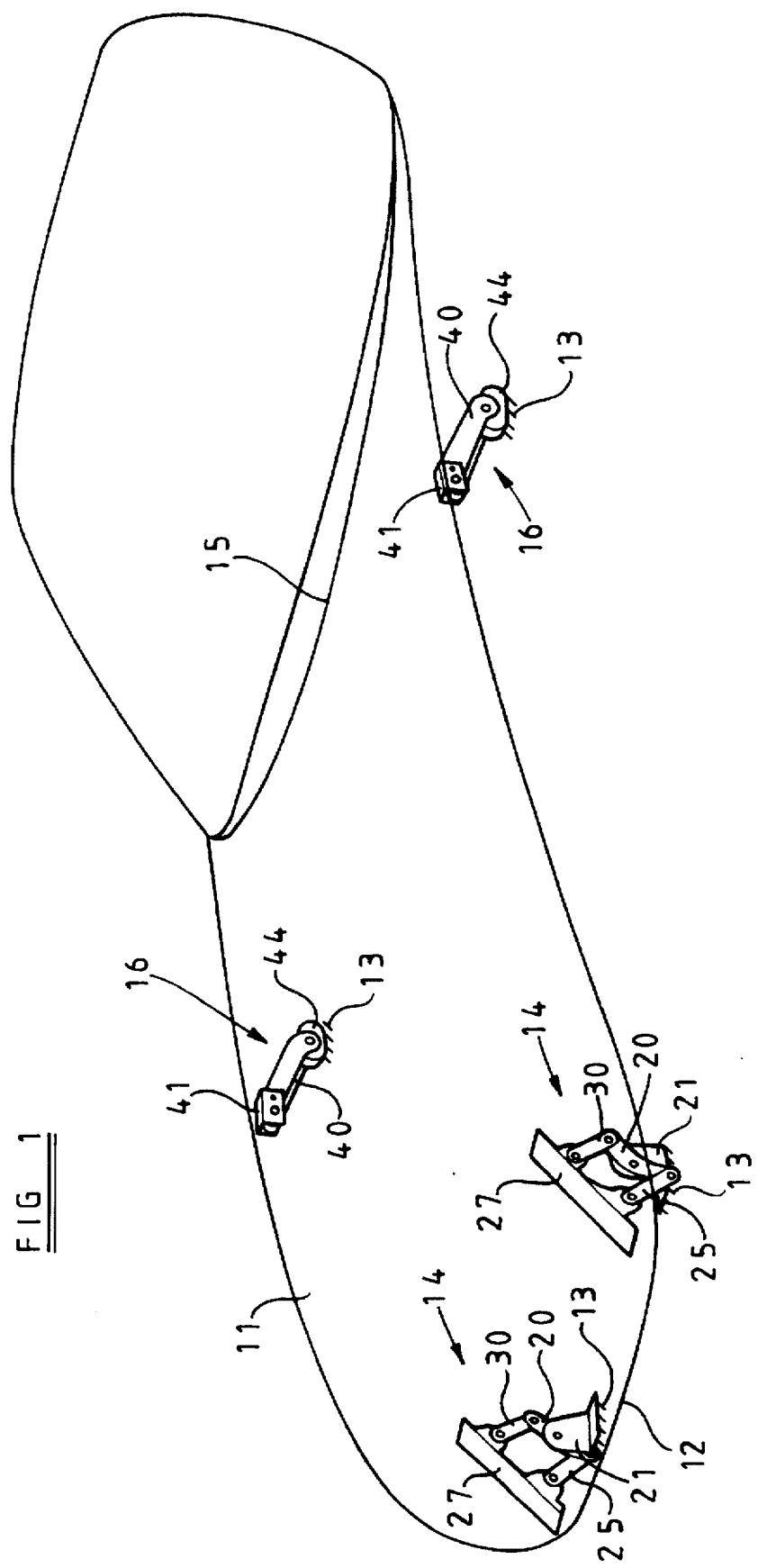
FIG. 1 is a perspective view of a bonnet assembly in accordance with the present invention.

As illustrated in FIGS. 1 to 3, a vehicle bonnet assembly 10 comprises a bonnet 11 which is secured adjacent its leading edge 12 to the vehicle body 13 by means of a pair of hinge assemblies 14, one hinge assembly 14 being located adjacent each of the longitudinal edges of the bonnet 11.

Towards the trailing edge 15 of the bonnet 11, a pair of latch assemblies 16 are located adjacent each longitudinal edge of the bonnet 11.

As illustrated in greater detail in FIGS. 2 and 3, the hinge assemblies 14 comprise a first link 20 which is mounted intermediate of its ends to a bracket 21 which is secured to the vehicle body 13, by means of a pivot 22, so that the link 20 is free to pivot in a plane parallel to the longitudinal axis of the vehicle. A second link 25 is pivotally secured at one end to one end of the link 20 by means of pivot 26 and at the other end to a bracket 27 that is secured to the bonnet 11, by means of pivot 28. A third link 30 is pivotally secured at one end to the other end of link 20 by means of pivot 31 and at the other end to bracket 27 at a position spaced rearwardly longitudinally of the pivot 28, by pivot 32.

Latch assemblies 16 each comprise a latch arm 40 which is pivotally attached to a bracket 41 mounted on the bonnet 11, for movement in the plane parallel to the longitudinal axis of the bonnet 11, by means of a pivot 42. The other end of the latch arm 40 has a pin 43 adapted to engage a latch mechanism 44 when the bonnet 11 is closed, engagement of the pin 43 by the latch mechanism 44 clamping the bonnet 11 in its closed position. A shear pin 45 is located between the arm 40 and bracket 41 to locate the arm 40 with respect to the bonnet 11, during normal operation of the bonnet 11 as illustrated in full line in FIG. 2.

If a load above a predetermined limit is applied to the leading edge 12 of the bonnet 11, for example as a result of a collision with a pedestrian, the bonnet 11 will move rearwardly shearing pin 45 and permitting the latch arm 40 to pivot upwardly about pin 43, thereby raising the trailing edge of the bonnet 15. The rearward movement of the bonnet 11 causes links 25 and 30 to pivot rearwardly also raising the leading edge 12 of the bonnet 11, as illustrated in broken line on FIG. 2. Raising of the bonnet 11 in this manner will increase the clearance beneath the bonnet 11, so that the bonnet 11 may deform to absorb the impact of a pedestrian therewith. For normal operation of the bonnet 11, the latch mechanism 44 is disengaged to release pin 43 so that the bonnet 11 may be pivoted upwardly from the trailing edge 15, about the pivot 22. The links 25 and 30 may be biased by means of springs (not shown) to pivot clockwise and increase the degree of opening of the bonnet 11 for a given rotational movement of the link 20 as illustrated in broken line in FIG. 3.

Various modifications may be made without departing from the invention. For example, the lengths of links 20, 25 and 30, the position of pivot 22 relative to pivots 26 and 31 and the length of latch arm 40 may be varied to provide the desired amount of lift of the bonnet at the forward and trailing ends 12 and 15. Furthermore, in addition to or as an alternative to the shear pin 45, shear pins may be provided between links 25 or 30 and the bracket 27 or between links 25 or 30 and the link 20. Alternatively, one or more of the pivots 22, 26, 28, 31, 32 or 42 may be torque loaded to appropriately control movement of the bonnet in its various modes of movement. The various links of the hinge and latch mechanisms may also be resiliently biased or balanced by spring means.

Figure 4:
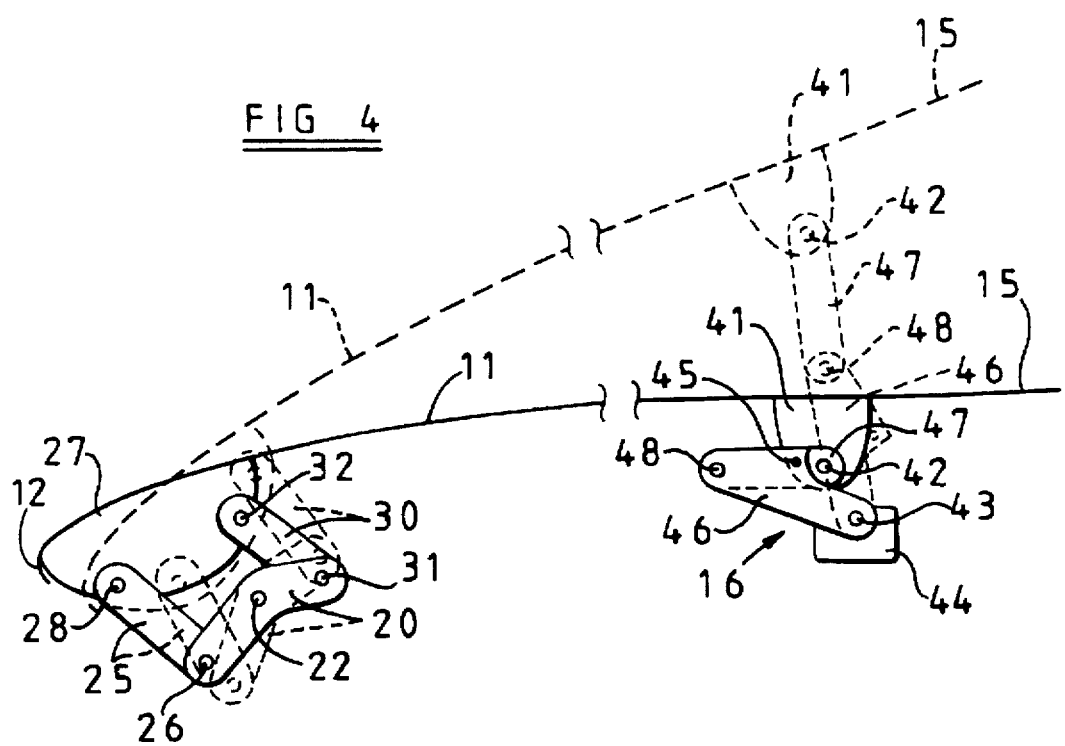
FIG. 4 shows a view similar to FIG. 2 of a modification to the bonnet assembly illustrated in FIG. 1.

In the embodiment illustrated in FIG. 4 the latch arm 40 of latch assembly 16 is replaced by a pair of links 46, 47; link 46 having the latch pin 43 adjacent one end and link 47 being pivotally attached to bracket 41 by pivot 42; the links 46, 47 being pivotally interconnected by pivot 48.

In normal operation the links 46 and 47 are rigidly fixed together and to the bracket 41, in a closed position, by means of shear pin 45. The latch pin 43 will consequently be held in fixed relationship to the bonnet 11 and will function in conventional manner to permit release or latching of the bonnet 11.

When the leading edge 12 of the bonnet 11 strikes a pedestrian, rearward movement of the bonnet 11 as described above, will cause pin 45 to shear, permitting links 46 and 47 to pivot with respect to the bracket 41 and each other to an open position, allowing the trailing edge 15 of the bonnet 11 to move upwardly. Opening of the links 46 and 47 may be assisted by pretensioned spring means (not shown). Such spring means may also serve to retain the bonnet 11 in its raised position when struck by the pedestrian. Alternatively or in addition, the links 46, 47 may be arranged to toggle over centre and thereby lock the links 46, 47 in the raised position. Suitable abutment means may be provided to prevent over rotation of the links 46 and 47.

In the above embodiments, abutment means may also be provided to prevent anticlockwise rotation of latch arm 40 about pivot 42 or links 46 and 47 about pivot 42, when the latch assembly 16 is in its normal condition, thereby avoiding stressing of the shear pin 45 when the latch pin 43 engages the latch mechanism 44 as the bonnet 11 is closed.

Figure 5:
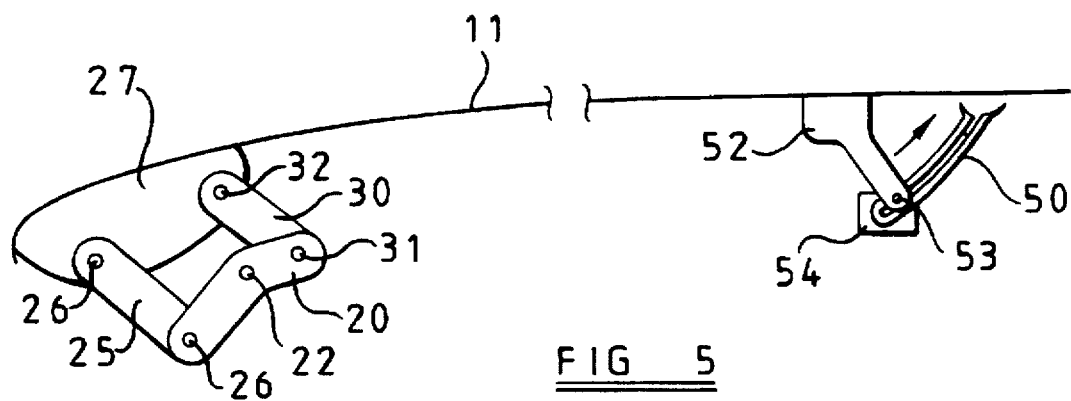
FIG. 5 shows a view similar to FIG. 2 of an alternative modification to the bonnet assembly illustrated in FIG. 1.

In the embodiment illustrated in FIG. 5, the latch assembly 16 is replaced by a pair of arcuate tracks 50. The tracks 50 are mounted on the vehicle body 13 adjacent each side of the bonnet 11. Brackets 52 mounted on the bonnet 11 towards the trailing edge 15 thereof, have pins 53 which engage in and slide along the tracks 50 as the bonnet 11 is pivoted between its opened and closed positions. Latching mechanisms 54 are provided at lower ends of the tracks 50 for engagement of the pins 53, when the bonnet is in its closed position.

With this modified arrangement, to open the bonnet 11, the latching mechanisms 54 are released and the trailing edge 15 of the bonnet 11 pivoted upwardly on the hinge assemblies 14 in simmilar manner to that described above. When a load is applied to the leading edge 12 of the bonnet 11, rearward movement of the bonnet will cause the latching mechanisms 54 to disengage permitting the pins 53 to ride up tracks 50 and raise the trailing edge 15 of the bonnet 11. The leading edge 12 of the bonnet 11 is raised by the hinge assemblies 14 as described above.

Figure 6:
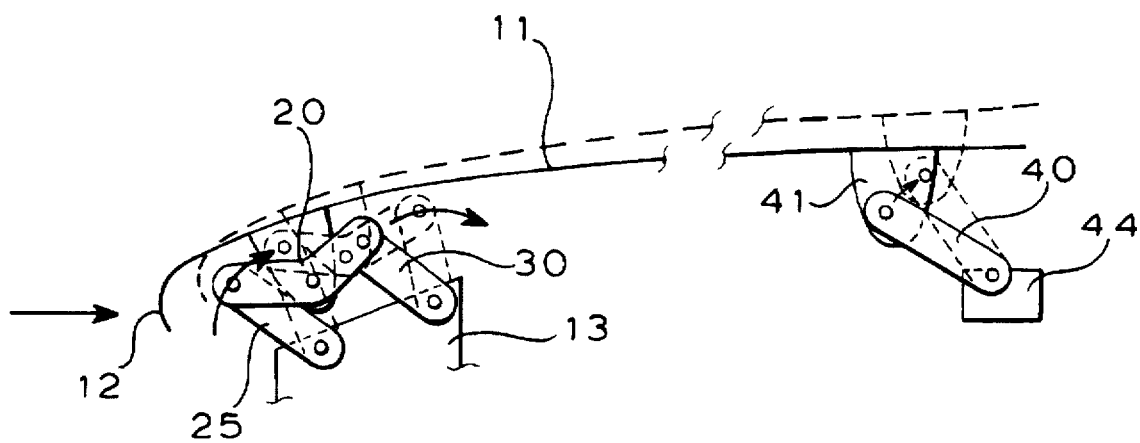
FIG. 6 shows a view similar to FIG. 2 of an alternative assembly in accordance with the present invention.

FIG. 6 illustrates an alternative assembly, in which the first link 20 is pivoted to the bonnet 11 and the second and third links 25 and 30 are pivotally connected between the first link 20 and the vehicle body 12.

I claim:

1. A vehicle bonnet assembly including a bonnet, said bonnet being hinged to the vehicle body adjacent a first edge transverse to a longitudinal axis of the vehicle and having releasable latch means adjacent a second axially remote transverse edge, the bonnet being hinged to the vehicle body by means of a hinge assembly comprising a first link, the first link being mounted on one of the vehicle body and bonnet intermediate of the extremities of the first link by pivot means, second and third links each being connected at one end to one of the extremities of the first link by pivot means, the other ends of the second and third links being connected to the other of the vehicle body and bonnet by pivot means and lifting means being provided adjacent the second edge of the bonnet, so that upon rearward movement of the bonnet in response to an impact above a predetermined magnitude being applied to a leading edge of the bonnet, the links will pivot and the lifting means act to lift the bonnet, the bonnet being pivoted between an open and a closed position about the pivot means between the first link and one of the vehicle body and the bonnet.

2. A vehicle bonnet assembly according to claim 1 in which the bonnet is hinged adjacent a leading edge means being provided adjacent a trailing edge of the bonnet to lift the trailing edge of the bonnet as the bonnet moves rearwardly in response to an impact above a predetermined magnitude being applied to the leading edge of the bonnet.

3. A vehicle bonnet assembly according to claim 2 in which the latch means comprises a latch arm pivotally attached at one end to one of the vehicle body and bonnet, a latch pin being provided at the other end of the latch arm for engagement of a latching mechanism, the latch arm pivoting about the latch pin to lift the trailing edge of the bonnet when the bonnet moves rearwardly in response to a load applied to the leading edge, the pin being releasable from the latch mechanism to permit opening of the bonnet.

4. A vehicle bonnet assembly according to claim 3 in which the latch arm comprises a pair of links pivotally interconnected.

5. A vehicle bonnet assembly according to claim 2 in which the latch means comprises an arcuate track mounted on the body of a vehicle, a latch pin being mounted on the vehicle bonnet for engagement of the track as the bonnet is moved between an open and a closed position, a latching mechanism being provided for engagement of the pin when the pin is at the lower end of the track, said track being arranged such that when the bonnet moves rearwardly in response to a load applied to the leading edge of the bonnet, the pin will ride up the track to lift the trailing edge of the bonnet.

6. A vehicle bonnet assembly according to claim 1 which means is provided to prevent movement of at least one of the hinge assembly and latch means until the load applied to the leading edge of the bonnet exceeds a predetermined magnitude.

7. A vehicle bonnet assembly according to claim 6 in which at least one shear pins is provided on at least one of the hinge assembly and latch means to prevent movement of the hinge assembly and latch means until the load applied to the leading edge of the bonnet exceeds the predetermined magnitude.

8. A vehicle bonnet according to claim 6 in which at least one or of the pivots of the hinge assembly and latch means are torque loaded to prevent relative movement of the components pivoted thereby, until the load applied to the leading edge of the bonnet exceeds the predetermined magnitude.

9. A vehicle bonnet assembly including a bonnet, said bonnet being hinged to the vehicle body adjacent a first edge transverse to a longitudinal axis of the vehicle and having releasable latch means adjacent a second axially remote transverse edge, the bonnet being hinged to the vehicle body by means of a hinge assembly comprising a first link, the first link being mounted on one of the vehicle body and bonnet intermediate of the extremities of the first link by pivot means, second and third links, being substantially parallel to one another, and each being connected at one end to one of the extremities of the first link by pivot means, the other ends of the second and third links being connected to the other of the vehicle body and bonnet by pivot means and lifting means being provided adjacent the second edge of the bonnet, so that upon rearward movement of the bonnet in response to an impact above a predetermined magnitude being applied to a leading edge of the bonnet, the links will pivot, while the second and the third links remain substantially parallel to one another, and the lifting means act to lift the bonnet, the bonnet being pivoted between an open and a closed position about the pivot means between the first link and one of the vehicle body and the bonnet.

* * * * *